(12) United States Patent
McClean

(10) Patent No.: US 10,898,825 B2
(45) Date of Patent: Jan. 26, 2021

(54) PASSIVE SOLAR WATER DISTILLER

(71) Applicant: Vincent Cuthbert McClean, Durants Park (BB)

(72) Inventor: Vincent Cuthbert McClean, Durants Park (BB)

( * ) Notice: Subject to any disclaimer, the term of this patent is extended or adjusted under 35 U.S.C. 154(b) by 0 days.

(21) Appl. No.: 16/653,956

(22) Filed: Oct. 15, 2019

(65) Prior Publication Data
US 2020/0114276 A1 Apr. 16, 2020

Related U.S. Application Data

(63) Continuation-in-part of application No. 62/745,158, filed on Oct. 12, 2018.

(51) Int. Cl.
| | |
|---|---|
| *B01D 1/00* | (2006.01) |
| *C02F 1/04* | (2006.01) |
| *B01D 5/00* | (2006.01) |
| *C02F 1/14* | (2006.01) |
| *C02F 103/08* | (2006.01) |

(52) U.S. Cl.
CPC ......... *B01D 1/0035* (2013.01); *B01D 1/0052* (2013.01); *B01D 5/006* (2013.01); *C02F 1/043* (2013.01); *C02F 1/14* (2013.01); *C02F 2103/08* (2013.01); *C02F 2201/005* (2013.01)

(58) Field of Classification Search
CPC ...... B01D 1/0035; B01D 1/0052; B01D 5/06; C02F 1/043; C02F 1/14; C02F 2103/08; C02F 2201/005; Y02A 20/212
See application file for complete search history.

(56) References Cited

U.S. PATENT DOCUMENTS

2007/0193872 A1* 8/2007 Garcia ................ B01D 3/42
202/234

* cited by examiner

*Primary Examiner* — Brian A McCaig

(57) ABSTRACT

A passive solar water distiller is an apparatus that utilizes sunlight to maximize the output of clean water with increased surface area for evaporation and condensation and effective means to retain and store heat. The apparatus includes a retaining basin, a plurality of evacuated tubes, a vapor-enhancing system, a plurality of transparent condensing covers, and a gutter system. The retaining basin houses contaminated water. The plurality of evacuated tubes heats the contaminated water within the retaining basin with solar energy. The vapor-enhancing system facilitates the vaporization of the contaminated water, leaving the contaminants within the retaining basin. The vapor-enhancing system also stores heat so that the apparatus is able to release heat and operate during nighttime hours or while there is a lack of direct sunlight. The plurality of transparent condensing covers increases the surface area for condensate of clean water to drip into the gutter system for collection.

18 Claims, 8 Drawing Sheets

PASSIVE SOLAR WATER DISTILLER

The current application claims priority to U.S. provisional application Ser. No. 62/745,158 filed on Oct. 12, 2018. The current application is filed on the next business day, which is Oct. 15, 2019, while Oct. 12, 2019 was on a weekend and Oct. 14, 2019 was on a national holiday Columbus Day.

FIELD OF THE INVENTION

The present invention generally relates to water distillers. More specifically, the present invention is a passive solar water distiller that maximizes the condensation of water vapor with increased surface area.

BACKGROUND OF THE INVENTION

Passive solar water distillation devices (solar stills) are a well-established art. In modern times, solar stills have proven to be very useful in the production of pure water for safe consumption in many remote and economically disadvantaged areas of the world. The lack of clean drinking water promotes the spread of many dangerous diseases which in turn result in low national economic productivity and in some cases high morbidity rates. Solar stills are able to purify contaminated water as well as seawater to a level of purity that exceeds the levels of most modern reverse osmosis plants. However, most passive solar stills are still very inefficient and oftentimes the ones that are slightly more efficient are too expensive to be of widespread use in the developing world. In addition, most currently available solar stills have many disadvantages. Most available passive solar stills are not capable of working long after the sun has set and none or few have been designed to work on fishing boats because of the rocking motion of the boats. The rocking motion causes the raw unprocessed water to splash into the distillate (purified water) and negates the entire process. Some passive solar stills may have a reflector which increases the quantity of sunlight entering the basin to promote faster heating or higher temperatures. There are, however, many other advances and improvements that can be applied and have been applied to solar stills that considerably improve the production of pure water. Thus, there is a need for a solar still which is not only cheap and easy to produce but is also a highly efficient device that is able to purify water to the level of purity required for human consumption and in enough quantities to be used by a small family.

An objective of the present invention is to provide a passive solar energy water distillation device. The present invention is designed to augment all areas of functionality of solar stills by increasing the efficiency and productivity and the usefulness of a solar still. The present invention enhances the surface area available for the condensation of the water vapor to allow for the easy dissipation of the latent heat of condensation by providing a large glass surface for condensation and conduction of heat to the external ambient environment. The present invention continues to condense water vapor without direct sun exposure by utilizing Phase Change Materials (PCMs). The PCMs allow the passive solar energy water distillation device to operate during the nighttime hours and, as result, further facilitate the yield of the still due to prolonged evaporation and condensation working time. The present invention can be mounted onto fishing boats, so that the present invention can be used as a potable emergency fresh water-providing device. The present invention allows for easy and quick maintenance and cleaning of accumulated solids.

DETAIL DESCRIPTIONS OF THE INVENTION

All illustrations of the drawings are for the purpose of describing selected versions of the present invention and are not intended to limit the scope of the present invention.

The present invention is a passive solar water distiller that increases the surface area available for condensation of water vapor and facilitates the dissipation of latent heat of condensation. The present invention, seen in FIG. 1, further maximizes the output of clean water by harnessing and storing heat so that during period with no direct sunlight, the present invention is able to still continuously evaporate and condense water housed within the present invention. The present invention is portable and may be mounted with fishing boats to serve as an emergency fresh water source as the present invention is able to maintain a steady output of clean water regardless of the water current surrounding the fishing boat. As the present invention is portable, it is essential that the present invention is easily and quickly maintained and cleaned. The present invention allows a user to easily remove any solids accumulated from housed water, improving the overall output of the present invention as well.

Figure 2:
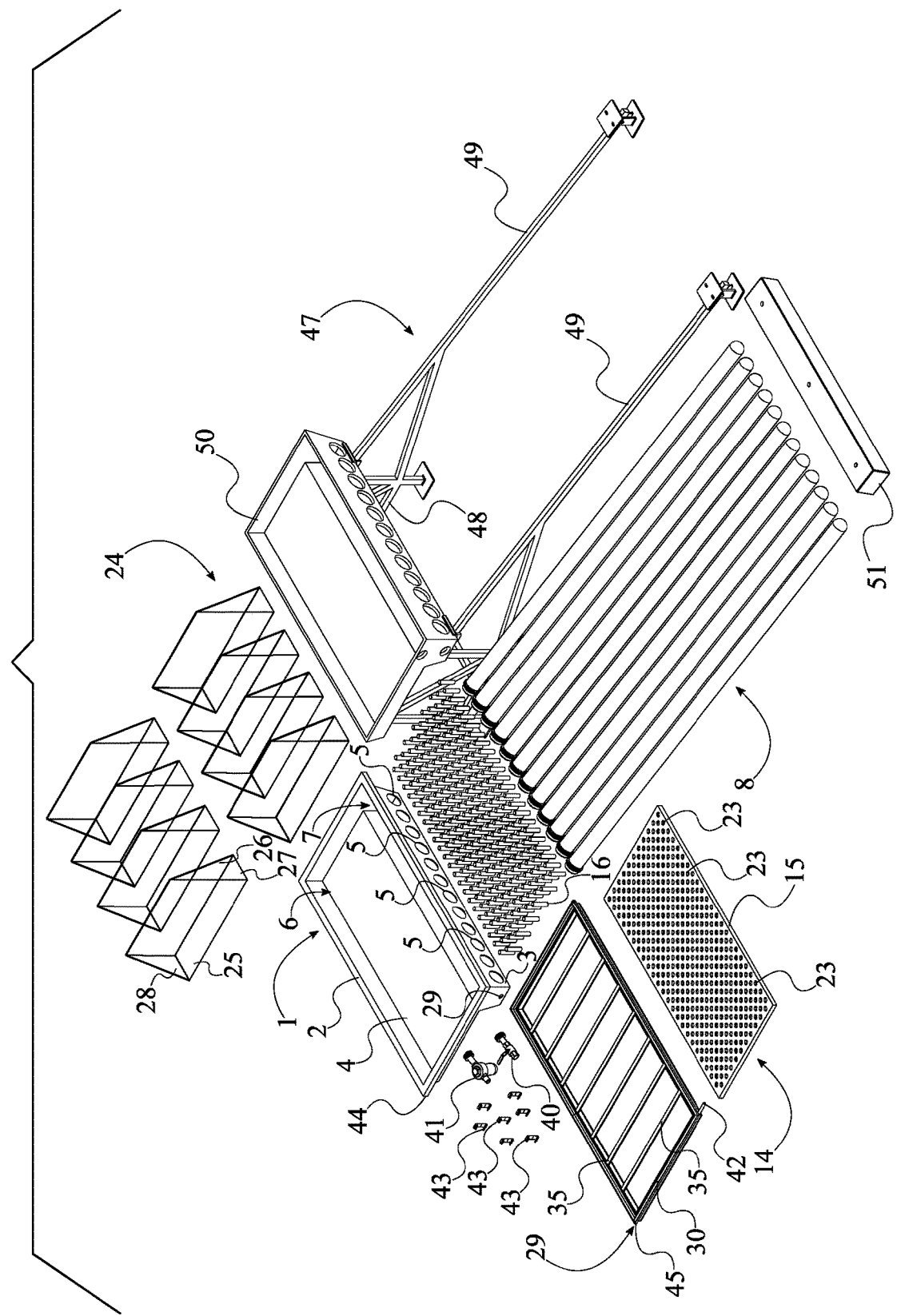
FIG. 2 is an exploded view of the present invention.
Figure 3:
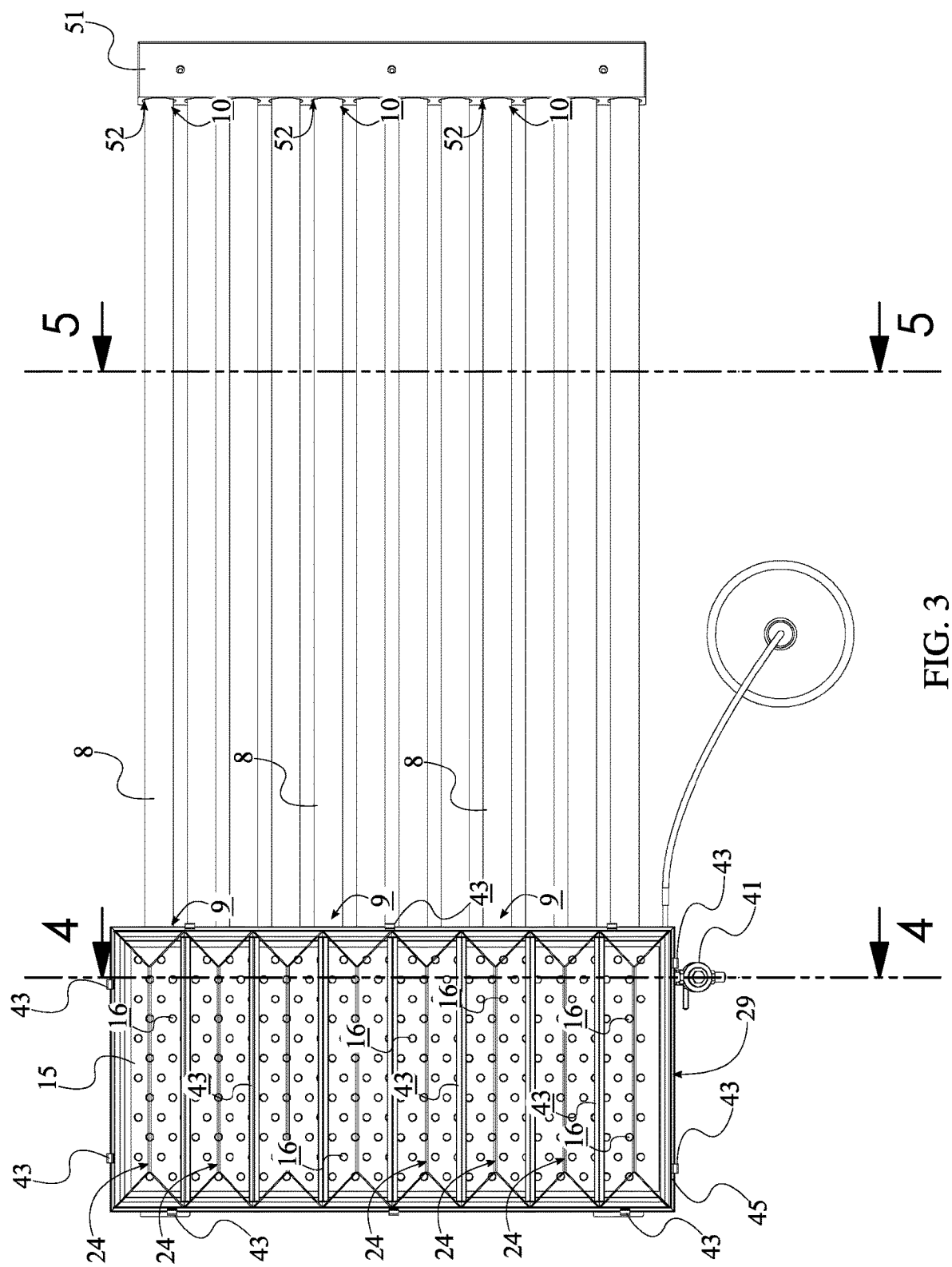
FIG. 3 is a top side view of the present invention.

In order for the present invention to maximize surface area for evaporation and condensation while storing and increasing heat within the present invention, the present invention comprises a retaining basin 1, a plurality of evacuated tubes 8, a vapor-enhancing system 14, a plurality of transparent condensing covers 24, and a gutter system 29, seen in FIG. 2. The retaining basin 1 houses contaminated water that is harnessed from an external water supply such as a lake or ocean. The contaminated water may comprise salts or other contaminates that are not suitable for consumption. The retaining basin 1 comprises a basin rim 2 and a basin lateral wall 3, allowing the retaining basin 1 to also connected with the gutter system 29 as well as uphold the plurality of evacuated tubes 8, the vapor-enhancing system 14, and the plurality of transparent condensing covers 24.

The contaminated water within the retaining basin 1 is rapidly heated to higher temperatures with the plurality of evacuated tubes 8. The plurality of evacuated tubes 8, seen in FIG. 1, FIG. 2, FIG. 3, and FIG. 5, utilizes solar energy to efficiently heat contaminated water regardless of the temperature of the surrounding environment. In the preferred embodiment of the present invention, the plurality of evacuated tubes 8 comprises borosilicate materials that further maximize the heating of the contaminated water flowing into each of the plurality of evacuated tubes 8.

Figure 6:
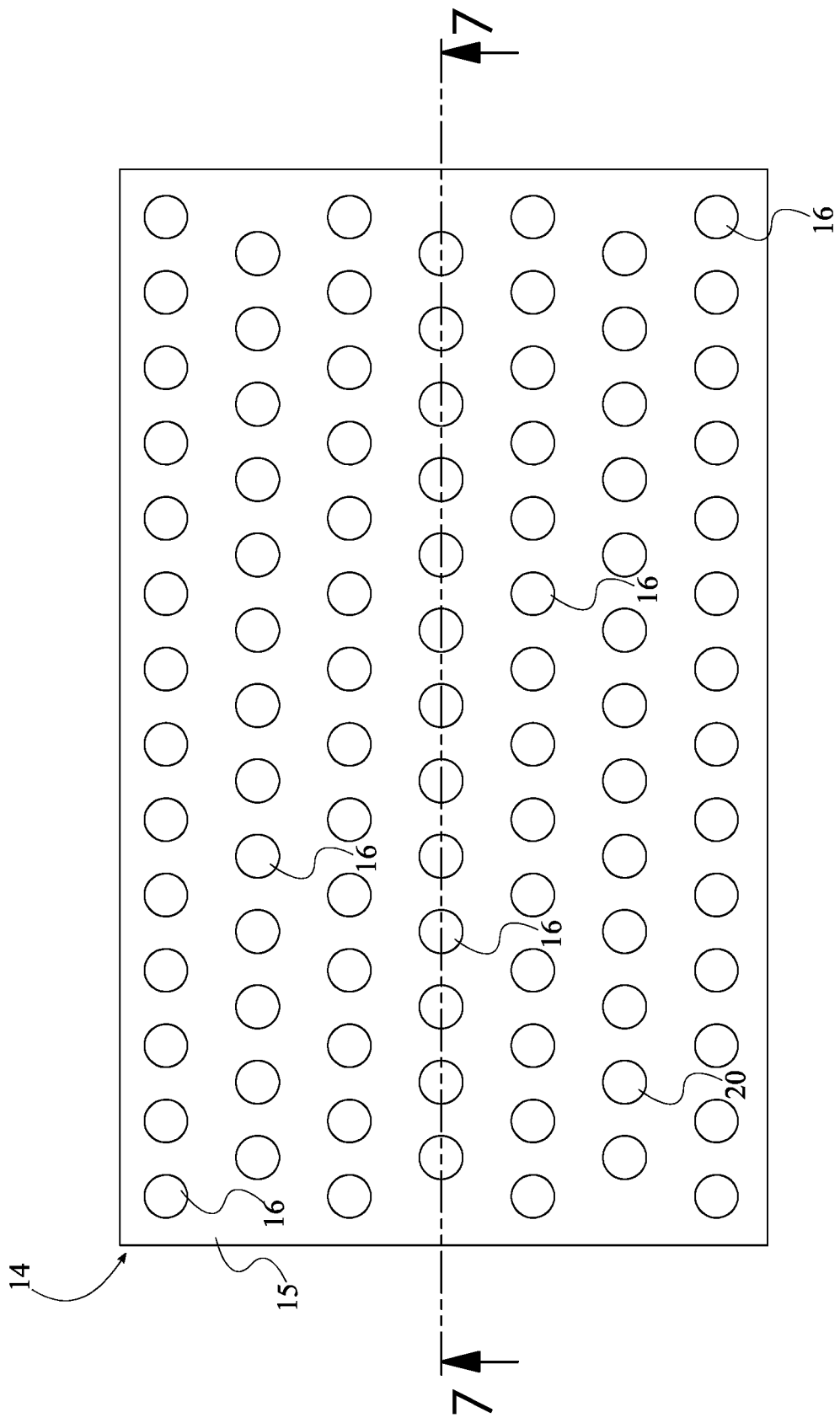
FIG. 6 is a top side view of a vapor-enhancing system of the present invention.

The heat within the present invention is not wasted as the present invention continuously operates even without direct sunlight. The vapor-enhancing system 14, seen in FIG. 2, FIG. 6, and FIG. 7, stores heat while directly exposed to solar energy and then radiates heat when solar energy is absent. The vapor-enhancing system 14 directs water vapor towards the plurality of transparent condensing covers 24 and maximizes the surface area for the evaporation of water. The vapor-enhancing system 14 comprises a supporting plate 15 and a plurality of fluid-transferring heat pipes 16. The supporting plate 15 upholds the fluid-transferring heat pipes 16 and seals the contaminated water within the retaining basin 1. The supporting plate 15 preferably comprises ultraviolet radiation resistant material that reflects sunlight. The fluid-transferring heat pipes 16 collectively have a larger surface area than that of the retaining basin 1, facilitating the evaporation of clean water. Moreover, the plurality of fluid-transferring heat pipes 16 comprises aluminum material layered with phase changing material (PCM) so that the heat absorption range of the plurality of fluid-transferring heat pipes 16 is increased, allowing the excessive heat produced by the plurality of evacuated tubes 8 to be stored as latent heat by PCM. Consequently, evaporation of water through the plurality of phase changing tubes 16 continues even without direct sunlight.

The vapor enhancing system allows the present invention continuously to operate regardless of the conditions of the surrounding environment with the plurality of fluid-transferring heat pipes 16. However, upon nightfall and lack of direct sunlight the output of clean water is greatly enhanced because of the plurality of fluid-transferring heat pipes 16. As the temperature of the surrounding environment falls, the condensation rate drastically increases because the exterior surfaces of the plurality of transparent condensing covers 24 becomes several degrees cooler than during the range of time while directly exposed to sunlight. The condensation rate increases significantly, and the latent heat trapped by the plurality of fluid-transferring heat pipes 16 is more effective during nightfall because of the lower ambient temperature and a lower dew point. The present invention is therefore as effective during the day and nighttime.

Figure 1:
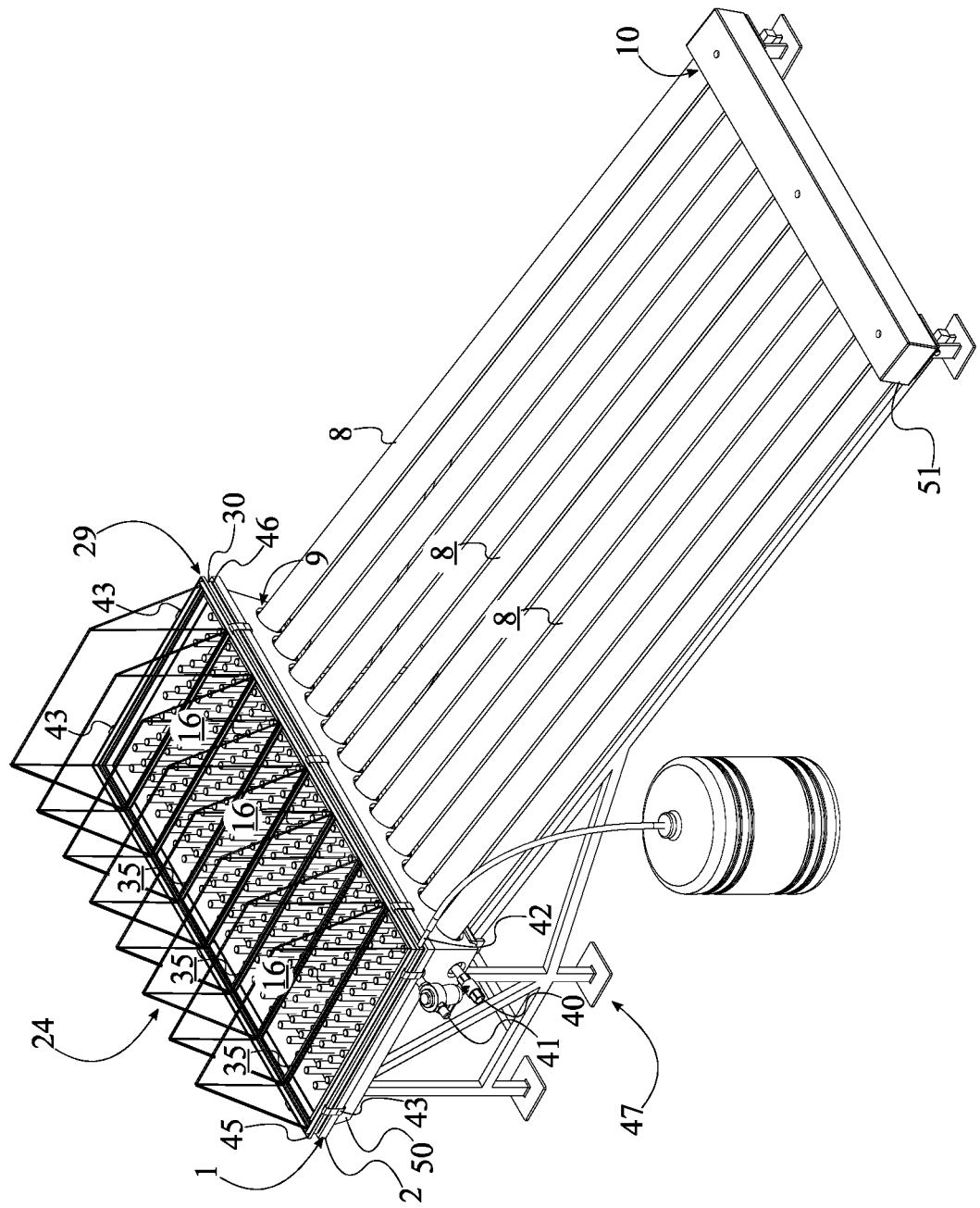
FIG. 1 is a perspective view of the present invention.
Figure 4:
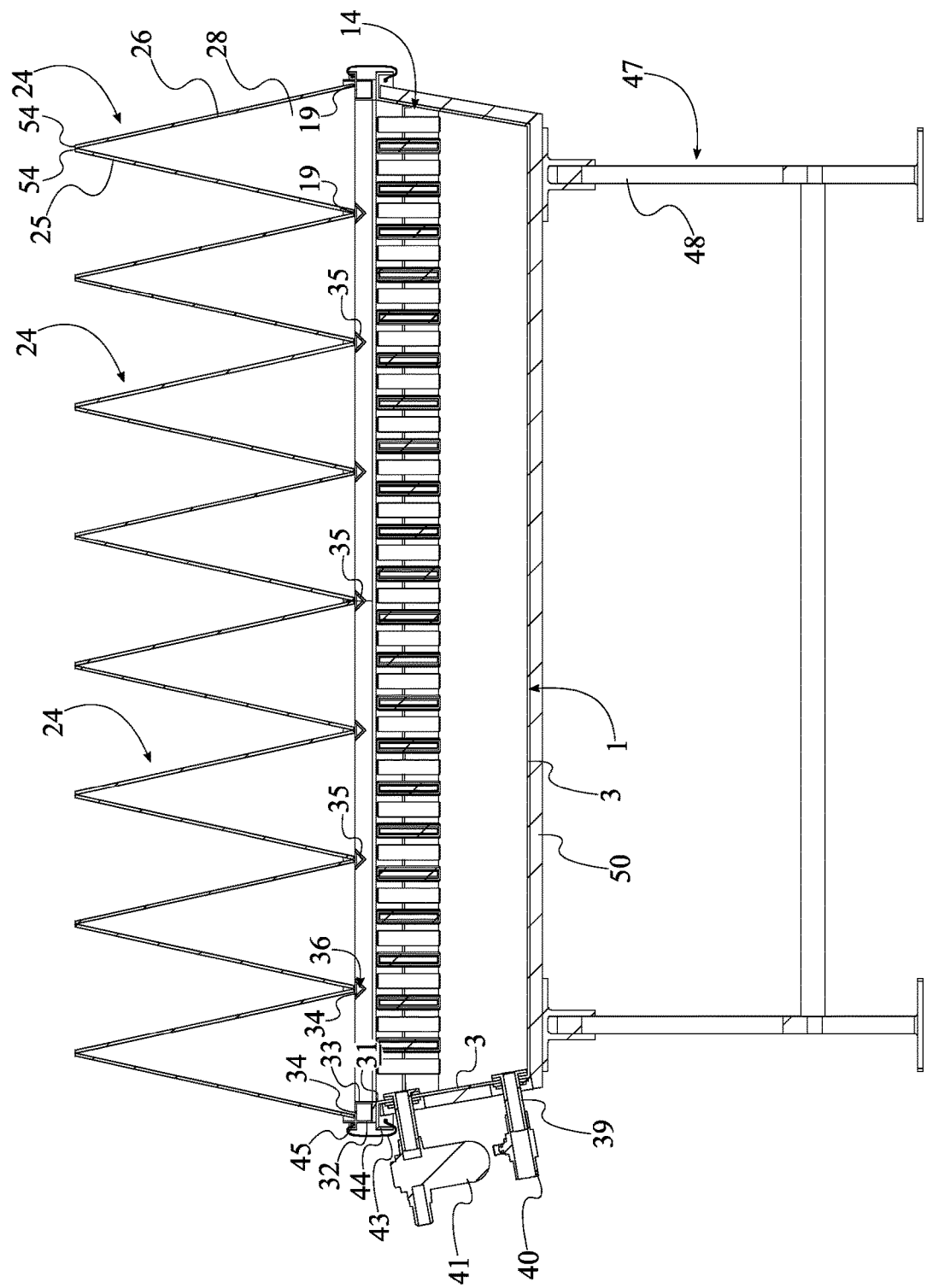
FIG. 4 is a cross-section view taken along line 4-4 in FIG. 3.

The overall configuration of the aforementioned components facilitates the evaporation and condensation of clean water from contaminated water housed within the present invention through maximized heat absorption, heat production, and heat storage. In order to naturally heat contaminated water within the retaining basin 1, the retaining basin 1 is terminally positioned to the plurality of evacuated tubes 8 and is fluid communication with the plurality of evacuated tubes 8, as seen in FIG. 1 and FIG. 4. A main gutter frame 30 is connected onto the basin rim 2, and the plurality of transparent condensing covers 24 is positioned adjacent the main gutter frame 30, opposite the retaining basin 1. This arrangement contains the vapor from the vapor-enhancing system 14 and directs the condensed water, so the clean water is easily collected. More specifically, the plurality of transparent condensing covers 24 is serially distributed across the main gutter frame 30, maximizing the condensation of water vapor. The vapor-enhancing system 14 is securely positioned within the retaining basin 1 as the supporting plate 15 is internally mounted against the basin lateral wall 3. The contaminated water is safely separated from the clean water as each of the fluid-transferring heat pipes 16 is hermetically connected through the supporting plate 15. Each of the fluid-transferring heat pipes 16 is distributed across the supporting plate 15, maximizing the vapor traversing across the plurality of fluid-transferring heat pipes 16. Clean water is continuously collected with the evaporation and the condensation from the contaminated water as the retaining basin 1 is in fluid communication with the gutter system 29 through the plurality of fluid-transferring heat pipes 16 and the plurality of transparent condensing covers 24.

The contaminated water within the retaining basin 1 is securely contained and continuously heated as the retaining basin 1 further comprises a basin base 4 and a plurality of input slots 5, seen in FIG. 2. The basin base 4 upholds the basin lateral wall 3, and the plurality of input slots 5 allows the plurality of evacuated tubes 8 to connect through the retaining base while preserving the structural integrity of the retaining basin 1. In order to contain the contaminated water, the basin lateral wall 3 is perimetrically fixed around the basin base 4. The plurality of input slots 5 traverses through the basin lateral wall 3 and is serially distributed across the basin lateral wall 3. This arrangement allows water from within the retaining basin 1 to naturally flow into the plurality of evacuated tubes 8. More specifically, a first end 9 of each of the plurality of evacuated tubes 8 is hermetically connected with the basin lateral wall 3 through a corresponding input slot of the plurality of input slots 5. The contaminated water does not leak through the connection between the plurality of evacuated tubes 8 and the retaining basin 1.

In order to fill the retaining basin 1 with contaminated water, the present invention further comprises a supply inlet 39, seen in FIG. 2 and FIG. 4. The supply inlet 39 allows an external contaminated water source to be directed into the retaining basin 1 with a tube or pipe, preferably connected with a pump that automatically and continuously fills the retaining basin 1 with contaminated water. The supply inlet 39 is in fluid communication with the retaining basin 1 in order to receive contaminated water from an external contaminated water source. The flow of contaminated water may be manually opened and closed as the present invention further comprise a ball valve 40. The supply inlet 39 is in fluid communication with the retaining basin 1 though the ball valve 40, effectively managing the flow of contaminated water into the retaining basin 1. In order to manage the water level within the retaining basin 1, the present invention further comprises an overflow valve 41. The overflow valve 41 is in fluid communication with the retaining basin 1 and is positioned in between the basin rim 2 and the supply inlet 39. This arrangement allows the supply inlet 39 to deliver contaminated water into the retaining basin 1 and the water level to raise from the supply inlet 39 towards the overflow valve 41.

The structural integrity of the retaining basin 1 is maintained as the retaining basin 1 further comprises a tray portion 6 and a reservoir portion 7, also seen in FIG. 2. The tray portion 6 directly upholds the vapor-enhancing system 14 and the gutter system 29. The reservoir portion 7 connects the plurality of evacuated tubes 8 with the tray portion 6. The tray portion 6 is positioned adjacent the reservoir portion 7, and the plurality of evacuated tubes 8 is positioned adjacent the reservoir portion 7, opposite the tray portion 6. This arrangement balances the weight of the contaminated water housed within the retaining basin 1 and evenly displaces the force from the water entering and exiting the plurality of evacuated tubes 8. More specifically, the plurality of fluid-transferring heat pipes 16 is distributed across the reservoir portion 7 and the tray portion 6. Moreover, in the preferred embodiment of the present invention, the reservoir portion 7 comprises a larger depth than that of the tray portion 6, evenly displacing the weight of the contaminated water between the tray portion 6 and the plurality of evacuated tubes 8. In addition, any residue remaining within the retaining basin 1 is directed and collected within the reservoir portion 7.

Figure 5:
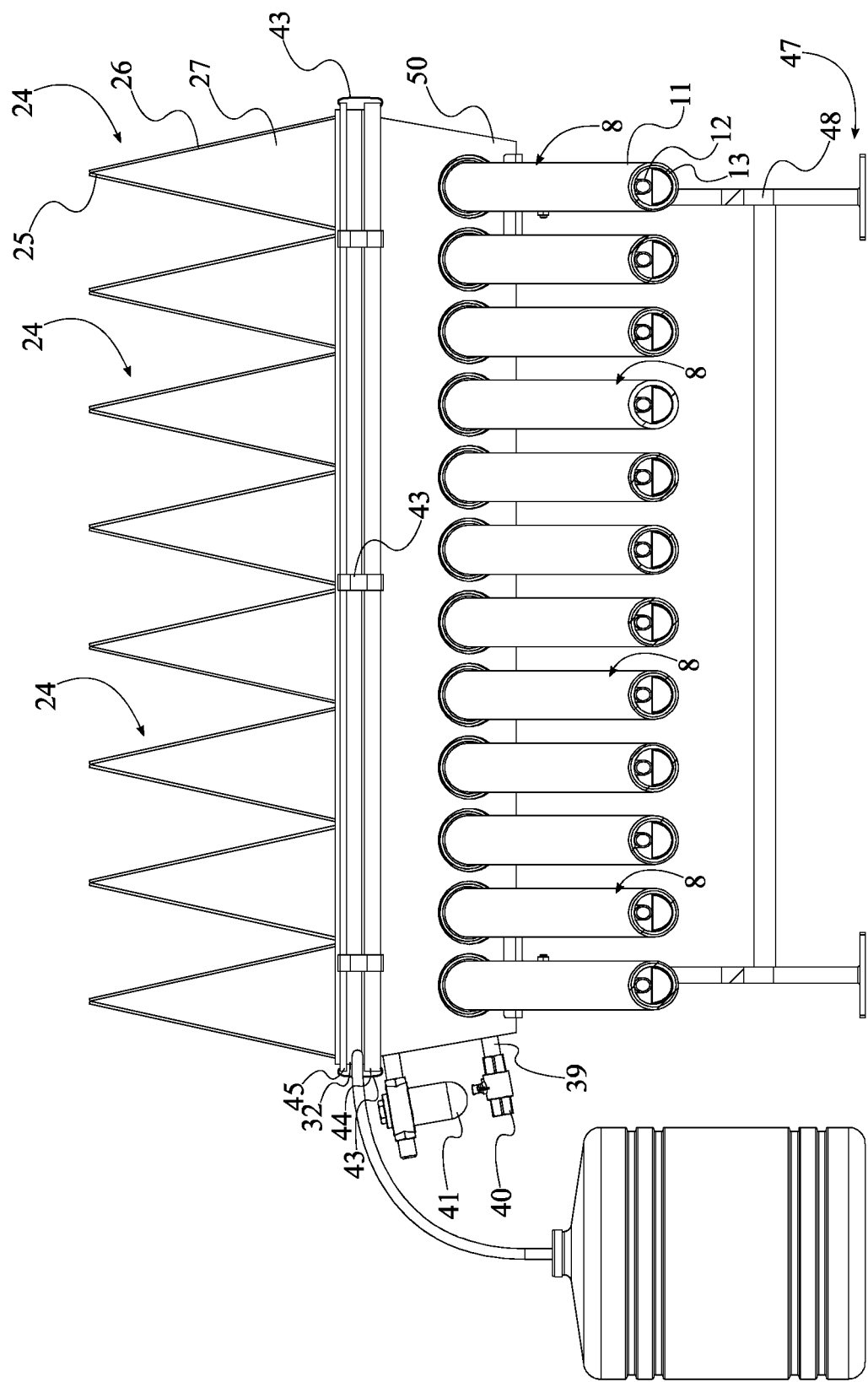
FIG. 5 is a cross-section view taken along line 5-5 in FIG. 3.

In order to rapidly and thoroughly heat the contaminated water within the retaining basin 1, each of the plurality of evacuated tubes 8 comprises a transparent vacuum tube 11, a heating tube 12, and an absorber layer 13, seen in FIG. 5. The transparent vacuum tube 11 houses the heating tube 12 and the absorber layer 13, as well as allows sunlight to come into direct contact with the heating tube 12 and the absorber layer 13. The heating tube 12 contains the contaminated water flowing into each of the plurality of evacuated tubes 8. Moreover, the heating tube 12 allows the cooler water to enter each of the plurality of evacuated tubes 8 and the hotter water to raise back into the retaining basin 1. The absorber layer 13 increases the absorption of heat around the transparent vacuum tube 11 and consequently increases the temperature of the heating tube 12. In order to effectively heat the contaminated water, the basin lateral wall 3 is terminally connected to the transparent vacuum tube 11. The heating tube 12 and the absorber layer 13 is mounted within the transparent vacuum tube 11 and positioned along the transparent vacuum tube 11, maximizing the amount of water being heated within each of the plurality of evacuated tubes 8. The transparent vacuum tube 11 allows solar energy to heat the absorber layer 13 as the transparent vacuum tube 11 is in thermal communication with the absorber layer 13. Consequently, the heating tube 12 is also heated, as the absorber layer 13 is in thermal communication with the heating tube 12. Contaminated water continuously enters into and out of heating tube 12 as the heating tube 12 is in fluid communication with the retaining basin 1. The cooler contaminated water naturally enters the heating tube 12 and the hotter contaminated water naturally exits the heating tube 12 as each of the plurality of evacuated tubes 8 is oriented at an obtuse angle with the basin base 4.

The increased temperature of the contaminated water beneath the supporting plate 15 of the vapor-enhancing system 14 leads to evaporation which is directed and accelerated with the vapor-enhancing system 14. The vapor-enhancing system 14 further comprises a plurality of tube-receiving slots 23, and each of the plurality of fluid-transferring heat pipes 16 comprises a first pipe end 17 and a second pipe end 18, seen in FIG. 2 and FIG. 7. The plurality of tube-receiving slots 23 allows the plurality of fluid-transferring heat pipes 16 to traverse through the supporting plate 15 while preserving the structural integrity of the supporting plate 15. The water vapors rise from the second pipe end 18 and then rise from the first pipe end 17 towards the plurality of transparent condensing covers 24. The plurality of tube-receiving slots 23 is distributed across the supporting plate 15 and traverses through the supporting plate 15, positioning and orienting the plurality of fluid-transferring heat pipes 16 between the contaminated water within the retaining basin 1 and the plurality of transparent condensing covers 24. Most of the contaminants of the contaminated water is kept beneath the supporting plate 15, allowing only the water vapor to traverse across the plurality of fluid-transferring heat pipes 16 as each of the plurality of fluid-transferring heat pipes 16 is hermetically connected with the supporting plate 15 through a corresponding tube-receiving slot of the plurality of tube-receiving slots 23. More specifically, the first pipe end 17 is oriented towards the plurality of transparent condensing covers 24, and the second pipe end 18 is oriented towards the retaining basin 1. This vertical orientation restricts radiative heat loss while increasing vapor production with the plurality of fluid-permeable socks 20. Furthermore, the vertical orientation further ensures the confinement of the contaminated water underneath the supporting plate 15, limiting any splash back of the contaminated water through the vapor-enhancing system 14. The overall efficiency of the present invention is enhanced with the vertical orientation of the plurality of plurality of fluid-transferring heat pipes 16 as the vertical orientation defines a lower radiative heat rate, effectively conserving radiative heat.

Figure 7:
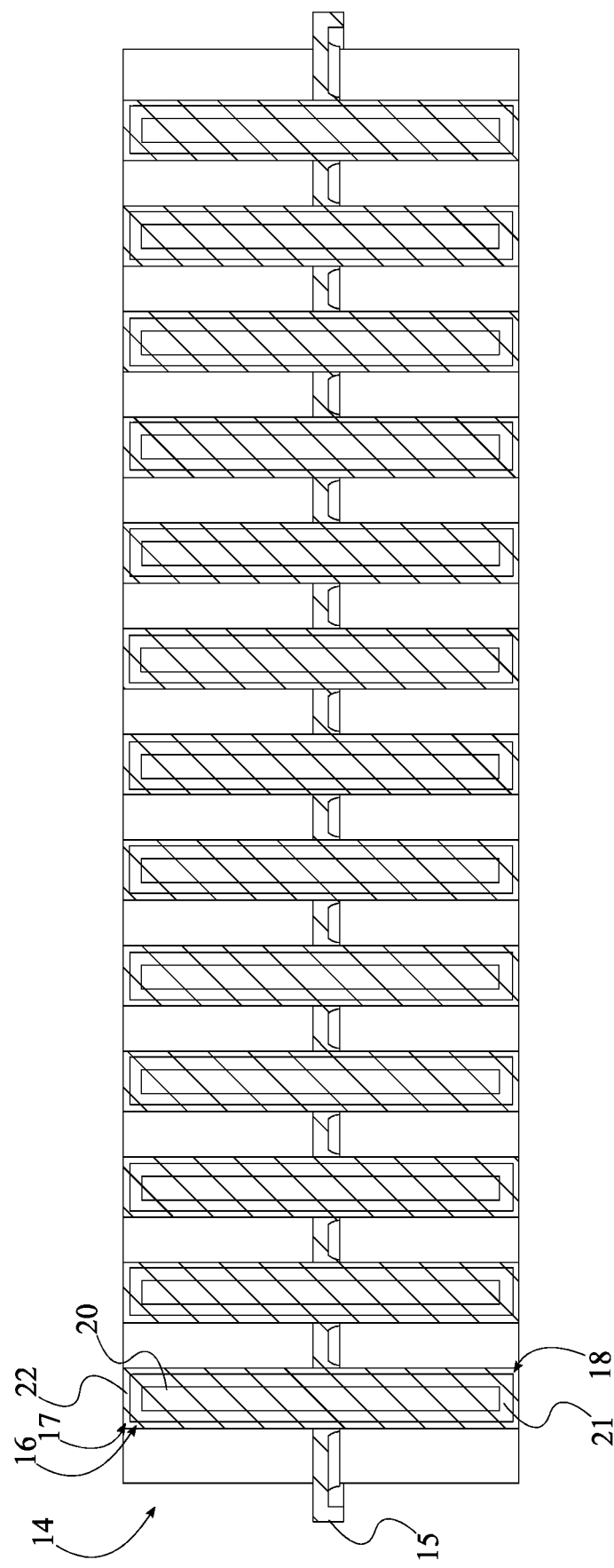
FIG. 7 is a cross-section view taken along line 7-7 in FIG. 6.

Each of the plurality of fluid-transferring heat pipes 16 comprises a thermally conductive rod 20, a layer of phase changing material 21, and a wicking cover 22, allowing the vapor-enhancing system 14 to continuously output clean water, also seen in FIG. 7. The thermally conductive rod 20 absorbs and stores heat so that the contaminated water continuously evaporates through the wicking cover 22. The layer of phase changing material 21 increases the rate of heat absorption for the thermally conductive rod and serves as a heat supply for the thermally conductive rod 20 when the present invention is not exposed to direct solar energy. The wicking cover 22 surrounds the plurality of fluid-transferring heat pipes 16, further facilitating the evaporation of clean water by providing increased surface area for vaporization. The wicking cover 22 preferably comprises fleece-like material that facilitates the capillary action, causing clean water to traverse across the plurality of fluid-transferring heat pipes 16. The increased surface area of the wicking cover 22 results in high vapor output towards the plurality of transparent condensing covers 24. The wicking cover 22 also serves as radiation barrier as the wicking cover 22 is naturally insulative. Consequently, the heat trapped within the present invention is effectively utilized to evaporate and then condense contaminated water through the vapor-enhancing system 14. It is understood that various embodiments of the present invention may comprise a wicking cover 22 with microfiber material or cotton material. The layer of phase changing material 21 is externally superimposed onto the thermally conductive rod 20. The layer of phase changing material 21 and the thermally conductive rod 20 are enclosed by the wicking cover 22. This arrangement allows the water vapor of the contaminated water comes into direct contact with the wicking cover 22 and the vaporization of the contaminated water across the wicking cover 22 is maximized. The vaporization of the contaminated water is rapidly and continuously traversing across the plurality of fluid-transferring heat pipes 16 as the retaining basin 1 is in fluid communication with the plurality of transparent condensing covers 24 through the wicking cover 22 of each of the plurality of fluid-transferring heat pipes 16.

Figure 8:
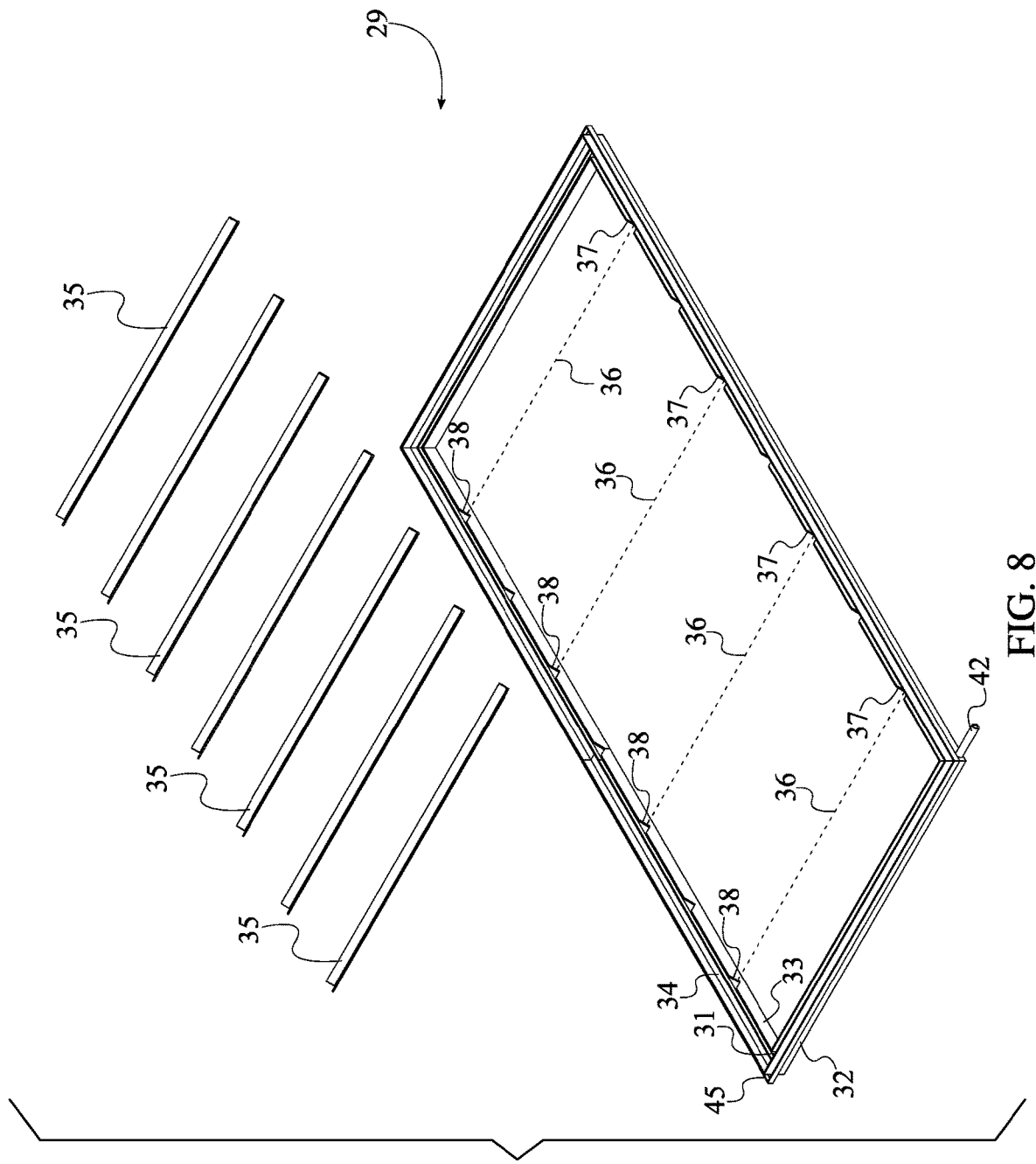
FIG. 8 is an exploded view a gutter system of the present invention.

In order to maximize the collected water from the plurality of transparent condensing covers 24, the gutter system 29 further comprises a ledge 34 and a plurality of supplementary gutters 35, seen in FIG. 4, FIG. 5, and FIG. 8. The ledge 34 upholds the plurality of transparent condensing covers 24 around the main gutter frame 30 and the plurality of supplementary gutters 35 collects condensation from each of the plurality of transparent condensing covers 24. The main gutter frame 30 collects condensation from each of the plurality of transparent condensing covers 24 as well as the main gutter frame 30 comprises a base plate 31, an outer lateral plate 32, and an inner lateral plate 33. The base plate 31 upholds the outer lateral plate 32 and the inner lateral plate 33. The outer lateral plate 32 and the inner lateral plate 33 surround the base plate 31 and channels the condensation that has dripped from the plurality of transparent condensing covers 24 for collection. The base plate 31 is positioned adjacent and fixed in between the outer lateral plate 32 and the inner lateral plate 33. The basin rim 2 is positioned adjacent to the base plate 31, opposite both the outer lateral plate 32 and the inner lateral plate 33, orienting an opening of the main gutter frame 30 beneath a perimeter of the plurality of transparent condensing covers 24. The ledge 34 is fixed adjacent the outer lateral plate 32 and is oriented towards the inner lateral plate 33 so that the plurality of transparent condensing covers 24 does not slip past the main gutter frame 30. The ledge 34 traverses along the main gutter frame 30 to structurally support and uphold the plurality of transparent condensing covers 24. More specifically, each of the plurality of transparent condensing covers 24 is mounted onto the ledge 34. The plurality of transparent condensing covers 24 is preferably adhered with the ledge 34 so that the heat is further insulated within the present invention and the plurality of transparent condensing covers 24 is secured with the remainder of the present invention. The plurality of supplementary gutters 35 is mounted across the main gutter frame 30 in order to collect condensation dripping from each of the transparent condensing covers of the plurality of transparent condensing covers 24. The plurality of fluid-transferring heat pipes 16 is in fluid communication with the main gutter frame 30 and the plurality of supplementary gutters 35 through the plurality of transparent condensing covers 24 as condensation drips from each of the plurality of transparent condensing covers 24 into an adjacent supplementary gutter of the plurality of supplementary gutters 35 and the main gutter frame 30.

Although the plurality of supplementary gutters 35 is mounted across the main gutter frame 30, the retaining basin 1 is easily accessed and maintained as the plurality of supplementary gutters 35 is preferably fixed with the main gutter frame 30, and both the main gutter frame 30 with the plurality of supplementary gutters 35 are removable from the retaining basin 1, as seen in FIG. 2. The gutter system 29 further comprises a plurality of paired notch sets 36, seen in FIG. 8, that allow each of the plurality of supplementary gutters 35 to securely rest within a corresponding pair of notch sets. More specifically, each of the plurality of paired notch sets 36 comprises a first notch 37 and a second notch 38. The first notch 37 and the second notch 38 traverse into the inner lateral plate 33 and are positioned opposite to each other about the main gutter frame 30. This arrangement allows the plurality of supplementary gutters 35 to traverse across the main gutter frame 30. Each of the plurality of supplementary gutters 35 is positioned into a corresponding set from the plurality of paired notch sets 36, securely suspending each of the plurality of supplementary gutters 35 across the main gutter frame 30 and over the retaining basin 1.

As the surface area for the evaporation of water is increased with the vapor-enhancing system 14, the surface area for the plurality of transparent condensing covers 24 must also be increased to accommodate the increased water vapor. The plurality of transparent condensing covers 24 comprises a first tilted panel 25, a second tilted panel 26, a first gamble panel 27, and a second gamble panel 28, seen in FIG. 2, FIG. 4, and FIG. 5. The first tilted panel 25, the second tilted panel 26, the first gamble panel 27, and the second gamble panel 28 are preferably tempered glass that allows sunlight to enter the present invention through the plurality of transparent condensing covers 24 and continuously heat the environment within the present invention. The first tilted panel 25 and the second tilted panel 26 maximize the surface area of each of the plurality of transparent condensing covers 24 the first gamble panel 27 and the second gamble panel 28 enclose each of the plurality of transparent condensing covers 24 around the first tilted panel 25 and the second tilted panel 26.

The overall configuration of each of the plurality of transparent condensing covers 24 is a triangular prism, clearly shown in FIG. 4 and FIG. 5, that encourages the flow of condensation directly into the main gutter frame 30 and the plurality of supplementary gutters 35. The first tilted panel 25 and the second tilted panel 26 comprises a proximal edge 19 and a distal edge 54. The distal edge 54 of the first tilted panel 25 is fixed along the distal edge 54 of the second tilted panel 26. The distal edge 54 of the first tilted panel 25 and the distal edge 54 of the second tilted panel 26 are positioned offset from the gutter system 29. This arrangement defines an apex for each of the plurality of transparent condensing covers 24. The proximal edge 19 of the first tilted panel 25 is positioned parallel and offset from the proximal edge 19 of the second tilted panel 26. The proximal edge 19 of the first tilted panel 25 and the proximal edge 19 of the second tilted panel 26 are positioned adjacent to the gutter system 29. This arrangement allows the water vapor to raise from the vapor-enhancing system 14 and condense along each of the plurality of transparent condensing covers 24. The water vapor is contained with each of the plurality of transparent condensing covers 24 as the first gamble panel 27 is fixed adjacent to both the first tilted panel 25 and the second tilted panel 26. Similarly, the second gamble panel 28 is fixed adjacent to both the first tilted panel 25 and the second tilted panel 26, opposite to the first gamble panel 27. This arrangement maximizes the yield of clean water and minimizes any loss of both heat and water vapor to the surrounding environment.

In order to collect clean water that has dripped along the plurality of transparent condensing covers 24 and fallen into the gutter system 29, the present invention further comprises an outlet tube 42, seen in FIG. 1, FIG. 2, and FIG. 8. The outlet tube 42 allows another tube or pipe to be connected with the main gutter frame 30 and the clean water to be collected into a vessel. The outlet tube 42 is externally mounted to the main gutter frame 30, and the main gutter frame 30 is in fluid communication with the outlet tube 42. This arrangement provides a definite path for the clean water to exit the gutter system 29 uncontaminated.

In order to attach the gutter system 29, and consequently position the plurality of transparent condensing covers 24 over the retaining basin 1, the present invention further comprises a plurality of clamps 43, a first lip 44, and a second lip 45, seen in FIG. 1, FIG. 2, FIG. 3, FIG. 4, and FIG. 5. The plurality of clamps 43 allows the first lip 44 and the second lip 45 to be locked and unlocked with each other, allowing for easy access into the retaining basin 1 as necessary. The first lip 44 allows the plurality of clamps 43 to latch around the basin rim 2, and the second lip 45 allows the plurality of clamps 43 to latch around the main gutter frame 30. The first lip 44 is externally fixed around the basin rim 2 and is oriented away from the main gutter frame 30. Similarly, the second lip 45 is externally fixed around the main gutter frame 30 and is oriented away from the retaining basin 1. The first lip 44 and the second lip 45 are removably attached with each other with the plurality of clamps 43. The interior environment of the present invention is further insulated, specifically between the main gutter frame 30 and the retaining basin 1, as the present invention comprises a gasket 46. The gasket 46 seals the main gutter frame 30 around the retaining basin 1 as the plurality of clamps 43 applies force towards the gasket 46 with the first lip 44 and the second lip 45. More specifically, the gasket 46 is positioned in between the main gutter frame 30 and the basin rim 2 and traverses along the basin rim 2.

The present invention further comprises a frame 47, a basin housing 50, a tube support bar 51, and a plurality of anchor slots 52, stabilizing and securing the retaining basin 1 and the plurality of evacuated tubes 8 onto a surface or ground, also seen in seen in FIG. 1, FIG. 2, FIG. 3, FIG. 4, and FIG. 5. More specifically, the frame 47 comprises a basin portion 48 and an evacuated tube portion 49. The basin portion 48 upholds the basin housing 50, and the evacuated tube portion 49 upholds the plurality of evacuated tubes 8. The basin housing 50 upholds and suspends the retaining basin 1 such that the plurality of evacuated tubes 8 may extend downwards beside the retaining basin 1 in order to maintain the obtuse angle between the plurality of evacuated tubes 8 and the basin base 4. The tube support bar 51 and the plurality of anchor slots 52 positions and upholds each of the plurality of evacuated tubes 8 and offsets each of the plurality of evacuated tubes 8 accordingly. The frame 47, the basin housing 50, and the tube support bar 51 preferably comprise corrosion resistant aluminum material amplifying the reflection of sunlight towards the retaining basin 1 and the plurality of evacuated tubes 8.

The retaining basin 1 and the plurality of evacuated tubes 8 are upheld and supported from a surface or the ground as the basin portion 48 is connected adjacent with the evacuated tube portion 49, and the tube support bar 51 is connected adjacent with the evacuated tube portion 49, opposite the basin portion 48. The position of each of the plurality of evacuated tubes 8 are with the retaining basin 1 is secure as the tube support bar 51 traverses across the evacuated tube portion 49. Moreover, the plurality of anchor slots 52 is distributed along and traverse into the tube support bar 51. The basin housing 50 is positioned into the basin portion 48, and the retaining basin 1 is positioned within the basin housing 50. The plurality of evacuated tubes 8 is positioned adjacent with and traverses across the evacuated tube portion 49. This arrangement preserves the arrangement between the retaining basin 1 and the plurality of evacuated tubes 8. A second end 10 of each of the plurality of evacuated tubes 8 is positioned within a corresponding slot of the plurality of anchor slots 52, preserving the arrangement of the plurality of evacuated tubes 8 among each other.

The present invention further comprises a thermal insulation 53 to ensure that a high percentage of the heat within the retaining basin 1 is retained and used to facilitate the evaporation of contaminated water. In the preferred embodiment of the present invention, the retaining basin 1 is insulated with at least one inch of high-density polyurethane foam so that heat loss by conduction through the retaining basin 1 is minimized. The thermal insulation 53 is externally mounted to the retaining basin 1 and is in thermal communication with the retaining basin 1. Consequently, a low volume of contaminated water within the retaining basin 1 exposed to high heat creates a volatile environment within the retaining basin 1.

Although the invention has been explained in relation to its preferred embodiment, it is to be understood that many other possible modifications and variations can be made without departing from the spirit and scope of the invention as hereinafter claimed.

What is claimed is:

1. A passive solar water distiller comprises:
   a retaining basin;
   a plurality of evacuated tubes;
   a vapor-enhancing system;
   a plurality of transparent condensing covers;
   a gutter system;
   the retaining basin comprise a basin rim and a basin lateral wall;
   the vapor-enhancing system comprises a supporting plate and a plurality of fluid-transferring heat pipes;
   the retaining basin being terminally positioned to the plurality of evacuated tubes;
   the retaining basin being in fluid communication with the plurality of evacuated tubes;
   a main gutter frame of the gutter system being connected onto the basin rim;
   the plurality of transparent condensing covers being positioned adjacent the main gutter frame, opposite to the retaining basin;
   the plurality of transparent condensing covers being serially distributed across the main gutter frame;
   the supporting plate being internally mounted against the basin lateral wall;
   each of the plurality of fluid-transferring heat pipes being hermetically connected through the supporting plate;
   the plurality of fluid-transferring heat pipes being distributed across the supporting plate; and,
   the retaining basin being in fluid communication with the gutter system through the plurality of fluid-transferring heat pipes and the plurality of transparent condensing covers.

2. The passive solar water distiller as claimed in claim 1 comprises:
   the retaining basin further comprises a basin base and a plurality of input slots;
   the basin lateral wall being perimetrically fixed around the basin base;
   the plurality of input slots traversing through the basin lateral wall;
   the plurality of input slots being serially distributed along the basin lateral wall; and,
   a first end of each of the plurality of evacuated tubes being hermetically connected with the basin lateral wall through a corresponding input slot of the plurality of input slots.

3. The passive solar water distiller as claimed in claim 1 comprises:
   a supply inlet; and,
   the supply inlet being in fluid communication with the retaining basin.

4. The passive solar water distiller as claimed in claim 3 comprises:
   a ball valve; and,
   the supply inlet being in fluid communication with the retaining basin through the ball valve.

5. The passive solar water distiller as claimed in claim 3 comprises:
   an overflow valve;
   the overflow valve being in fluid communication with the retaining basin; and,
   the overflow valve being positioned in between the basin rim and the supply inlet.

6. The passive solar water distiller as claimed in claim 1 comprises:
   the retaining basin further comprises a tray portion and a reservoir portion;
   the tray portion being positioned adjacent the reservoir portion;
   the plurality of evacuated tubes being positioned adjacent the reservoir portion, opposite the tray portion; and,
   the plurality of fluid-transferring heat pipes being distributed across the reservoir portion and the tray portion.

7. The passive solar water distiller as claimed in claim 1 comprises:
- each of the plurality of evacuated tubes comprises a transparent vacuum tube, a heating tube, and an absorber layer;
- the basin lateral wall being terminally connected to the transparent vacuum tube;
- the heating tube and the absorber plate being mounted within the transparent vacuum tube;
- the heating tube and the absorber layer being positioned along the transparent vacuum tube;
- the transparent vacuum tube being in thermal communication with the absorber layer;
- the absorber layer being in thermal communication the heating tube; and,
- the heating tube being in fluid communication with the retaining basin.

8. The passive solar water distiller as claimed in claim 7 comprises:
- the retaining basin further comprises a basin base; and,
- each of the plurality of evacuated tubes being oriented at an obtuse angle with the basin base.

9. The passive solar water distiller as claimed in claim 1 comprises:
- the vapor-enhancing system further comprises a plurality of tube-receiving slots;
- each of the plurality of fluid-transferring heat pipe comprises a first pipe end and a second pipe end;
- the plurality of tube-receiving slots being distributed across the supporting plate;
- the plurality of tube-receiving slots traversing through the supporting plate;
- each of the plurality of fluid-transferring heat pipe being hermetically connected with the supporting plate through a corresponding tube-receiving slot of the plurality of tube-receiving slots;
- the first pipe end being oriented towards the plurality of transparent condensing covers; and,
- the second pipe end being oriented towards the retaining basin.

10. The passive solar water distiller as claimed in claim 1 comprises:
- each of the plurality of fluid-transferring heat pipes comprises a thermally conductive rod, a layer of phase changing material, and a wicking cover;
- the layer of phase changing material being externally superimposed onto the thermally conductive rod;
- the layer of phase changing material and the thermally conductive rod being enclosed by the wicking cover; and,
- the retaining basin being in fluid communication with the plurality of transparent condensing covers through the wicking cover of each of the plurality of fluid-transferring heat pipes.

11. The passive solar water distiller as claimed in claim 1 comprises:
- the gutter system further comprises a ledge and a plurality of supplementary gutters;
- the main gutter frame comprises a base plate, an outer lateral plate, and an inner lateral plate;
- the base plate being positioned adjacent the outer lateral plate and the inner lateral plate;
- the base plate being fixed in between the outer lateral plate and the inner lateral plate;
- the basin rim being positioned adjacent to the base plate, opposite both the outer lateral plate and the inner lateral plate;
- the ledge being fixed adjacent with the outer lateral plate;
- the ledge being oriented towards the inner lateral plate;
- the ledge traversing along the main gutter frame;
- the plurality of supplementary gutters being mounted across the main gutter frame;
- each of the plurality of transparent condensing covers being mounted onto the ledge; and,
- the plurality of fluid-transferring heat pipes being in fluid communication with the main gutter frame and the plurality of supplementary gutters through the plurality of transparent condensing covers.

12. The passive solar water distiller as claimed in claim 11 comprises:
- the gutter system further comprises a plurality of paired notch sets;
- each of the plurality of paired notch sets comprises a first notch and a second notch;
- the first notch and the second notch traversing into the inner lateral plate;
- the first notch and the second notch being positioned opposite to each other about the main gutter frame; and,
- each of the plurality of supplementary gutters being positioned into a corresponding set from the plurality of paired notch sets.

13. The passive solar water distiller as claimed in claim 1 comprises:
- the plurality of transparent condensing covers comprises a first tilted panel, a second tilted panel, a first gamble panel, and a second gamble panel;
- the first tilted panel and the second tilted panel comprises a proximal edge and a distal edge;
- the distal edge of the first tilted panel being fixed along the distal edge of the second tilted panel;
- the distal edge of the first tilted panel and the distal edge of the second tilted panel being positioned offset from the gutter system;
- the proximal edge of the first tilted panel being positioned parallel and offset from the proximal edge of the second tilted panel;
- the proximal edge of the first tilted panel and the proximal edge of the second tilted panel being positioned adjacent to the gutter system;
- the first gamble panel being fixed adjacent to both the first tilted panel and the second tilted panel; and,
- the second gamble panel being fixed adjacent to both the first tilted panel and the second tilted panel, opposite to the first gamble panel.

14. The passive solar water distiller as claimed in claim 1 comprises:
- an outlet tube;
- the outlet tube being externally mounted to the main gutter frame; and,
- the main gutter frame being in fluid communication the outlet tube.

15. The passive solar water distiller as claimed in claim 1 comprises:
- a plurality of clamps;
- a first lip;
- a second lip;
- the first lip being externally fixed around the basin rim;
- the first lip being oriented away from the main gutter frame;
- the second lip being externally fixed around the main gutter frame;
- the second lip being oriented away from the retaining basin; and, the first lip and the second lip being removably attached with each other with the plurality of clamps.

16. The passive solar water distiller as claimed in claim 1 comprises:
a gasket;
the gasket being positioned in between the main gutter frame and the basin rim; and,
the gasket traversing along the basin rim.

17. The passive solar water distiller as claimed in claim 1 comprises:
a frame;
a basin housing;
a tube support bar;
a plurality of anchor slots;
the frame comprises a basin portion and an evacuated tube portion;
the basin portion being connected adjacent with the evacuated tube portion;
the tube support bar being connected adjacent with the evacuated tube portion, opposite the basin portion;
the tube support bar traversing across the evacuated tube portion;
the plurality of anchor slots being distributed along the tube support bar;
the plurality of anchor slots traversing into the tube support bar;
the basin housing being positioned into the basin portion;
the retaining basin being positioned within the basin housing;
the plurality of evacuated tubes being positioned adjacent with the evacuated tube portion;
the plurality of evacuated tubes traversing across the evacuated tube portion; and,
a second end of each of the plurality of evacuated tubes being positioned within a corresponding slot of the plurality of anchor slots.

18. The passive solar water distiller as claimed in claim 1 comprises:
a thermal insulation;
the thermal insulation being externally mounted to the retaining basin; and,
the thermal insulation being in thermal communication with the retaining basin.

* * * * *